UNITED STATES PATENT OFFICE.

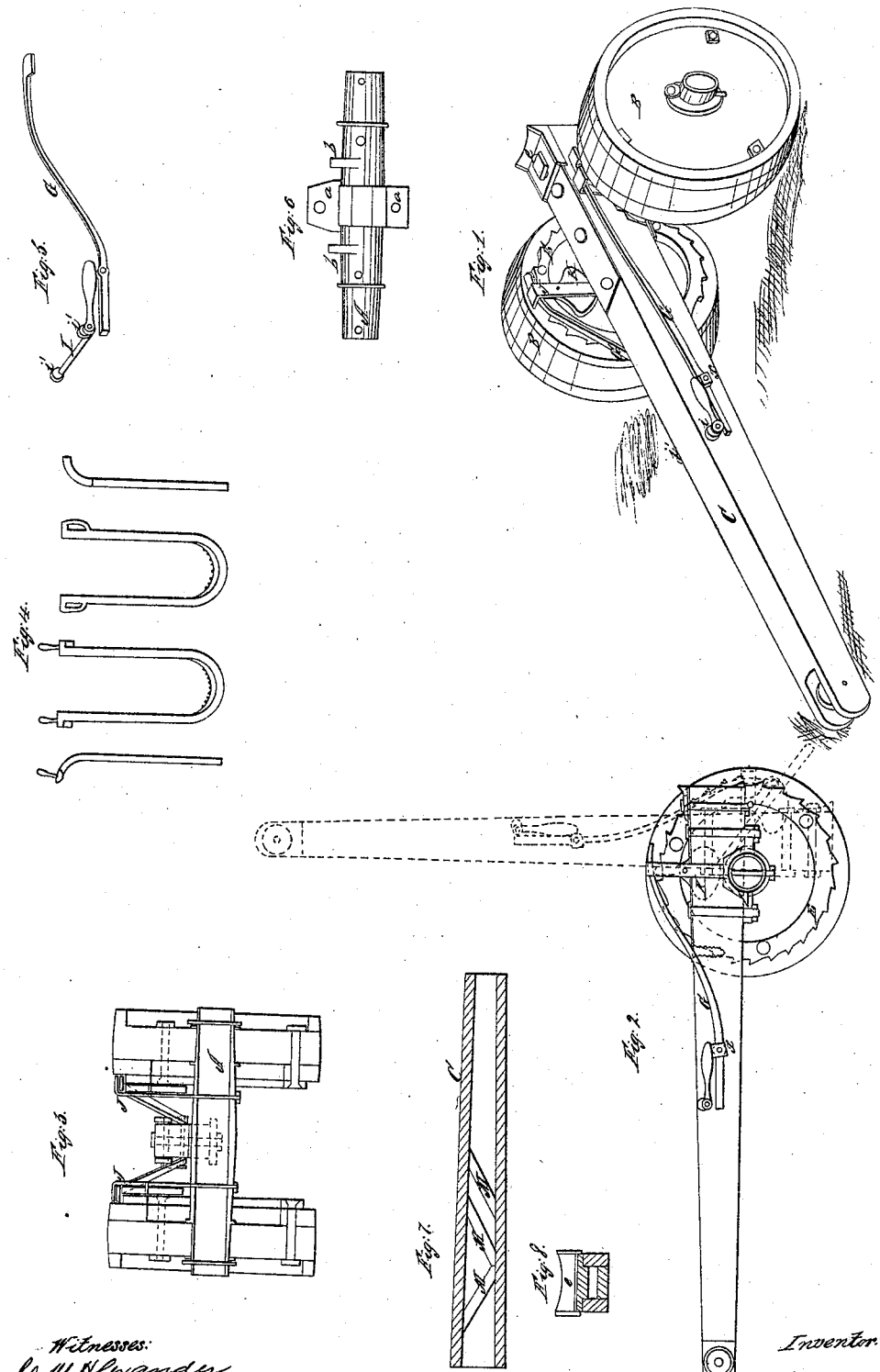

ALMERON McKENNEY, OF MAUMEE, OHIO.

IMPROVEMENT IN GRUBBING-MACHINES.

Specification forming part of Letters Patent No. 34,439, dated February 18, 1862.

*To all whom it may concern:*

Be it known that I, ALMERON MCKENNEY, of Maumee city, in the county of Lucas and State of Ohio, have invented certain new and useful Improvements in Grubbing-Machines; and I do hereby declare that the following is a full, clear, and exact description of the same, reference being had to the accompanying drawings, and to the letters of reference marked thereon.

In the annexed drawings making part of this specification, A represents the axle of the machine, which is made of cast-iron. This axle is cast hollow with a straight core, the hole through the said axle being one and a half inch in diameter. The axle is thirty inches long, three inches in diameter at its middle, and tapering upon its periphery to one and three-quarters inch at its ends.

$a\ a$ represent two flanges, which are cast upon opposite sides of the axle, through and by means of which the lever is bolted to it.

$b\ b$ represent projections cast upon the axle in the position shown in Fig. 6, upon which the clevis catches when the machine is in operation, as will be hereinafter described.

B B represent the wheels of the machine, which are made twenty-six inches in diameter, being formed of two-inch boards bolted together with the grain of the wood crossed. These wheels are provided, as shown, with a rim or felly upon both sides, which is two inches wide, making the tread of the wheel eight inches. The rim or felly is very securely and firmly attached to the wheel and is intended to give breadth to the tread with as little weight as possible. A wheel constructed in this manner is very strong and at the same time is light and can be easily handled.

C represents the lever, which is made fast to the axle by means of bolts which pass through the flanges $a\ a$. This lever is made either solid or hollow. I prefer to make it hollow, because I can secure the required strength and have a lighter lever. The lever is made of boards and is eight feet long. The boards are one and a half inch thick. The lever is four inches thick, seven inches wide at the butt, and three and a half inches wide at its other end, leaving a hollow one inch by four at the butt and one inch by one half at the top.

A metallic plate is secured upon the top edge of the lever near its butt. At the butt-end and upon this plate is secured a metallic jaw $e$, by means of a bolt which passes through the lever. This jaw $e$ is provided with flanges which extend down upon the sides of the lever for the purpose of protecting it and keeping it from damage. The bolt passes through a slot in the jaw, which enables the said jaw to have a longitudinal adjustment upon the lever.

Secured upon each inner surface of the wheels B B is a ratchet-wheel E, which is made of metal. The surface of the teeth against which a ratchet-tooth catches is beveled or made slightly slanting toward the wheel to which it is secured. These ratchet-wheels are made twenty inches in diameter, five-eighths of an inch in thickness, and one inch wide.

G G represent two ratchet-hooks, which are bolted through an eye formed in them to the lever C at $x\ x$. These ratchet-hooks turn readily upon the bolt which secures them to the lever, so as to catch into the teeth of the wheels E E. The formation of the end of the hook which catches in the teeth is seen in Figs. 1 and 5. These ratchet-hooks are two feet long from hook to eye, extending four inches beyond the eye and are made of three-quarters square iron.

A small rod I, with two cams $i'$ upon it, one at each end, passes through the lever just above the pivoted ends of the ratchet-hooks and forward of the pivot or rod I, which, being operated by means of a handle, is used for depressing the front ends of the said ratchet-hooks when desired to prevent the hooks from catching into the teeth of the ratchet-wheels.

J J represent metallic bars, which are attached to the axle and which extend up and curve at their upper ends over the ratchet wheels and hooks, forming a protection and guard for the ratchet-hooks.

K represents a counterbalance-weight, which is pivoted to the bar J with the upper end suspended under and supporting the hooked end of the ratchet-hooks before the lever is raised for operation. The lower end of this counter-balance is made heavy, so that it will always hang in a vertical position. When the lever is raised to an upright position the weight swings upon its pivot, so as not to touch the ratchet-hook, and said hook is allowed to catch into the teeth of the wheel E.

The clevis seen in Fig. 4, which is used with this machine, is provided at its ends with hooks or shoulders which catch upon the projections *b b* on the axle. In the curve or bow of the clevis are seen teeth, which are formed upon a ridge first sharpened up to an edge and then rounded off a little. The object of using the teeth upon the clevis thus formed is that when the clevis being attached to the grub cuts into it slightly it will there hold and remain until the grub is pulled from the ground. If a plain sharp edge were used it would be liable in many cases to cut the small grub off before it was extracted from the ground.

In using this machine it is placed close to the grub and the lever C is elevated to a vertical position. The clevis is then made to straddle the grub and its ends are caught upon the projections *b b*. The ratchet-hooks are then allowed to catch into the teeth upon the wheels E E. Power is then applied to the end of the lever C. The wheels being locked, and thus made to form for the time a part of the lever, an upward and at the same time a forward motion is given to the grub, thus drawing it from the ground. The clevis may then be removed, the grub disengaged, and the machine is ready to be put into position for drawing again.

One of the great objects in the construction of this machine is lightness and strength. It is all important in an effective machine that it should be both light and strong, and it will be seen that I have secured, by the construction described, both of these qualities. One man can handle the machine, and it has strength sufficient to draw up grubs from six to eight inches in diameter.

The hollow lever is braced by stays M M, as shown in Fig. 7. These stays are used near the butt-end of the lever and are very important for giving it strength sufficient to bear the heavy strains. I may use two, three, or more of these stays, as may become necessary.

I am aware that the wheels of grubbing-machines have been locked during the process of pulling up the grub; consequently I do not wish to be understood as considering this general feature to be my invention.

That portion of my invention which relates to locking the wheels consists more particularly in the mode of accomplishing this result by the arrangement of devices hereinbefore described. I do not, moreover, consider that hollow axles, hollow levers, or wheels constructed of boards bolted together with the grain crossed, are new in themselves independent of the connection in which they are here used; but at the same time I am not aware that they have been used in this class of machines for making a light, strong, and effective machine, as herein set forth.

What I claim as new is—

1. The employment of the hollow axle A, constructed as specified, and provided with the flanges *a a*, and projections *b b*, as and for the purpose specified.

2. The employment of the wheels B B and the hollow lever C, as constructed and used in connection with the hollow axle A, for the purpose specified.

3. The combination of the ratchet-hooks G G, the ratchet-wheels E E, the lever C, the bars J J, and counter-balance K, constructed and arranged as specified.

4. The metallic jaw *e*, provided with flanges and a slot for longitudinal adjustment when bolted to the lever, as and for the purpose specified.

5. The employment of the clevis constructed in the manner described and used with the axle provided with lugs, as and for the purpose specified.

6. The employment of the bolt *i*, with eccentrics and handles in connection with the lever and ratchet-hooks to prevent the wheels from becoming locked too soon, substantially as herein specified.

A. McKENNEY.

Witnesses:
C. M. ALEXANDER,
A. A. YEATMAN.